United States Patent [19]

Jafri

[11] Patent Number: 4,895,606

[45] Date of Patent: Jan. 23, 1990

[54] FORMULATIONS FOR SOLDERING FLUX

[76] Inventor: Ashraf Jafri, 4 Fairview Avenue, Richmond Hill, Ontario, Canada, L4C 6L2

[21] Appl. No.: 314,414

[22] Filed: Feb. 23, 1989

[51] Int. Cl.$^4$ .............................................. B23K 35/34
[52] U.S. Cl. ......................................... 148/25; 148/24
[58] Field of Search ..................................... 148/25, 24

[56]  References Cited

U.S. PATENT DOCUMENTS

| | | | |
|---|---|---|---|
| 2,564,199 | 8/1951 | Feldman | 148/25 |
| 2,838,433 | 6/1958 | Ribera | 148/25 |
| 3,575,738 | 4/1971 | Becker | 148/25 |
| 3,963,529 | 6/1976 | Tsunashima | 148/25 |
| 4,360,392 | 11/1982 | Roberts | 148/25 |

Primary Examiner—Peter D. Rosenberg

[57] ABSTRACT

A soldering flux composition comprising a water-soluble oil-in-water emulsion paste in turn comprising
(a) an oil, type material
(b) an emulsifier,
(c) water, and
(d) a fluxing agent comprising an inorganic or organic halogen compound capable of removing oxide from a metal surface to be soldered.

12 Claims, No Drawings

FORMULATIONS FOR SOLDERING FLUX

FIELD OF INVENTION

The present invention relates to improved formulations for soldering flux suitable for use to solder copper, nickel, and copper alloys including nickel copper alloys.

BACKGROUND OF THE INVENTION

Solder fluxes have been and are being used in the form of pastes, especially in the plumbing industry. The carrier bases used today are in the form of petroleum jelly (petroletta), petrolethum and natural or synthetic rosins. When the petroleum products are used with heat, they generate smoke, and they are hazardous to the user's health. They also have a number of drawbacks for achieving a good soldering joint, for example, petroleum is greasy and therefore non-wetting, petroleum and resin burn and therefore present a fire hazard, petroleum and resin (rosin) create smoke and therefore are unhealthy to breathe, they are not water washable and they leave behind a residue which enhances corrosion, and contamination of drinking water, and petroleum products, resin and rosin bases are rough on the hands of the user—a substantial health problem.

U.S. Pat. No. 736,812 (to Bormann) relates to compositions for soldering. More specifically, this reference teaches a solder composition comprising a finely powdered soft solder which has been triturated to a paste (eg. tin alloy), a deoxidizing agent (eg. one or both of zinc chloride or ammonium chloride) and a "thickening body" (eg. cellulose). This composition suffers the disadvantages discussed above because it is essentially a resin or rosin product, and being organic it also has a flash point.—

U.S. Pat. No. 1,435,780 (to Wyatt) relates to a soldering composition which comprises water, zinc chloride, ammonium chloride, mercury and muriatic acid. The flux containing mercury is of course, totally undesirable because of health reasons. Because of the low ph of muriatic acid, it is therefore highly corrosive.

U.S. Pat. No. 1,775,197 (to Habif) purports to teach a composition which overcomes the disadvantages of the prior formulations which give off gases when used, which gases are detrimental to the health of the user. The formulation taught comprises a fluxing agent (eg. zinc chloride), a cleaning agent (eg. an alcohol), an adhesion agent (eg. glycerine, molasses or "any other syrupy material which will act to cause the solution to adhere to the surface to be soldered") and a dissolving agent (eg. water). The cleaning agent is intended to dissolve grease and also to serve as a thinner. The drawback with the teachings herein is that the formulation taught is a liquid. Being a liquid, the formulation is not easily retainable at the site of the soldering operation.

U.S. Pat. No. 2,493,372 (to Williams) relates to a brazing flux composition which comprises a halide or a boron-fluorine containing compound and a compound "containing only carbon, hydrogen and oxygen". This formulation is non-aqueous and non-hygroscopic in character. See column 2, line 48 to 49 of said Patent.

U.S. Pat. No. 3,912,550 (Assigned to Stannol-Lotmittelfabrik Wilhelm Paff) relates to flux compositions for solders comprising a resin-based (preferably rosin-based) carrier substance and an activating agent based on hydrohalic acid salts of organic amines having a specific formula set out in the Patent at column 2, lines 1 to 10.

U.S. Pat. No. 3,971,675 (Assigned to The Dow Chemical Company) relates to a purportedly non-fuming soldering flux composition comprising a mixture of zinc bromide and an alkali metal bromide, for example, sodium bromide, potassium bromide and lithium bromide.

U.S. Pat. No. 4,647,308 (Assigned to Copper Development Association, Inc.) relates to soldering compositions, fluxes and methods for their use. The compositions comprise copper, nickel, aluminum, chromium (optional), titanium (optional) and zinc (as the major component). The flux compositions comprise zinc chloride, ammonium chloride, tin chloride, hydrochloric acid, lithium borate ($Li_2B_4O_7$), magnesium bromide, zinc bromide and water.

U.S. Pat. No. 4,657,589 (Assigned to McDonnell Douglas Corporation) relates to a solder cream formulation comprising lead, tin, silver and gold particles. A base which includes abietic acid, paraffin wax, 2-butoxy (ethyl) ethyl acetate, cetyl alcohol, hydrogenated castor oil, isopropyl amine and FC71 vehicle. Because paraffin wax and cetyl alcohol are both solids, the cream must be formed in association with other compounds and this formulation does not include water. Furthermore, this composition does not relate to the flux but rather relates to a solder. Thus, the said Patent relates to a combination of solder and activating ingredients not a flux per se.

It is therefore an object of this invention to provide new flux compositions which overcome the above deficiencies of the prior art formulations by providing a flux composition which is water-soluble, has no flash point and is therefore, non-flammable, is non-toxic. When heated, the flux composition does not produce toxic substances, an unpleasant smell and irritating fumes.

It is a further object of this invention to provide flux compositions which are acid-free and which provide for improved tarnish-removing capability.

It a further object of this invention to provide such compositions that lower the cohesive force of the solder and therefore help in wetting the base metal surfaces.

It is still a further object of this invention to provide such a formulation which protects and clears the base metal surfaces and which is activated when the metal surface is heated.

SUMMARY OF THE INVENTION

According to one aspect of the invention, there is provided a soldering flux comprising a water soluble oil-in-water emulsion paste formulation in turn comprising:
(a) an oil or equivalent, for example, mineral oil, vegetable oil, petrolatum, and, petroleum jelly,; and
(b) an emulsifier, for example, glyceryl monostearate, and alcohol;
(c) water, and preferably de-ionized water;
(d) an inorganic or organic halogen compound, for example, zinc chloride capable of removing oxide from a metal surface to be soldered.

The formulation may also include preservatives and temperature stabilizers to enhance the shelf life of the formulation.

With respect to preservatives, it is apparent that, where zinc chloride is used, it may also act as a preservative. Therefore the addition of a specific preservative for the purpose of enhancing the shelf life of the composition is not essential to the usefulness and functionality of the composition as a flux composition.

Suitable emulsifiers may also include a number of products identified by their trade names, for example Promulgen ™ D which is a complex of C-16 to C-18 alcohols and their ethoxylates, Promulgen G which is similar to Pomulgen D except complexed with C-18 alcohols, Cerasyntgms CTFA ™, Cerasynt SD CTFA ™, Cerasynt WM CTFA ™, Cerasynt Q CTFA ™, Cerasynt MN CTFA ™, Amerchol L101 ™, Ameroxol OE-2 ™, Ameroxol OE-20 ™, Glucate SS ™, Glucamate SSE-20 ™, Ohlan ™, Solulan 5 ™, Solulan 25 ™, Glucate DO ™. These products are manufactured by Vandyk Products or Amerchol Products. Amerchol Products is located at 136 Talmadge Road, P.O. Box 4051 Edison, N.J., 08818-4051. Amerchol Products is represented in Canada by Charles Tennant and Company (Canada) Limited, 34 Clayson Road, Weston, Ontario, Canada, M9M 2G8.

The water may be distilled, tap, and de-ionized, although de-ionized is preferred.

The inorganic or organic halogen compound may be ammonium chloride, tin chloride, magnesium chloride, zinc chloride or other suitable active agents. It may also be zinc bromide, zinc iodide, sodium chloride, sodium bromide, potassium iodide, or other suitable hydrochlorides, hydrobromides, and hydrofluorides.

The formulation may also include a stabilizer as for example, lanolin anhydride.

The formulation may also include a humectant, for example, Glucam E-10 ™.

Component (a), the oil preferably is present in an amount of up to about 80% of the formulation depending on the formulation selected. However other concentrations are also possible depending on the formulation used.

The emulsifier preferably is present in an amount between about 2% to about 20% of the composition depending on the formulation. In some embodiments where the emulsifier is made up of a number of suitable emulsifiers, the total percentage of the emulsifiers will preferably fall within the range between about 2% to about 20%.

The preservative may be in an amount of about 0.1% where present, and the inorganic or organic halogen compound preferably is present in a range of between about 2% to about 20%.

The water makes up the balance.

In carrying out processes for the manufacture of such formulations, the oil and the emulsifier are preferably combined to form the oil phase. The water with the components added thereto is considered to be the water phase. The oil phase preferably is heated to for example, 60° C. to 80° C. at which the components are liquid. The water phase is heated to about the same temperature and slowly added to the oil phase with mixing.

The inorganic or organic halogen compound may be added to the water phase prior to addition to the oil phase or may be added to the mixture of the water phase and the oil phase subsequent to the mixing thereof. The preservative when added may be added to the water phase, and the stabilizer may be added to the oil phase.

When the two phases are mixed there is preferably continuous stirring to ensure emulsification to provide a suitably viscous cream.

The formulations according to the invention may be applied to the area desired to be soldered. The area may be cold or hot. The two components to be joined together may each be coated with the formulation using a brush or any other suitable means for application. Heat may then be applied and when the temperature reaches the melting point of the solder (50/50, 95/5 60/40 solder), the solder is applied. The resultant joint is metallurgically sound, uniform and free of corrosion with no choking smoke, smell or fire proximate the joint during the soldering process.

DETAIL DESCRIPTION OF PREFERRED EMBODIMENTS OF THE INVENTION

The invention will now be illustrated with reference to the following embodiments of the invention which shall be taken as illustrative of the invention and not in a limiting sense.

The following are examples of the formulations used and tested.

| FORMULA 1. | |
|---|---|
| (a) Mineral oil | 37.5% |
| Cetyl alcohol | 2.5% |
| Glyceryl stearate (SE) | 2.5% |
| (b) Water | 50% |
| (c) Zinc chloride | 7.5% |

| FORMULA 2. | |
|---|---|
| (a) Mineral oil | 40% |
| Glyceryl monostearate | 5% |
| (b) Water | 50% |
| (c) Zinc chloride | 5% |

In the manufacturing process, the water is boiled at 100° C. and the oil phase (a) to 80° C. The water is then added to the oil phase (a) is heated while stirring, and when cooled to 30° C., 5 gms of zinc chloride is added while vigorously stirring.

| FORMULA 3. | | |
|---|---|---|
| (a) Mineral oil | 60–75% | |
| Glyceryl monostearate (SE) | 3–5% | (emulsifier) |
| Emulgate 1000 NI | 8–12% | (emulsifier) |
| Stearyl alcohol | 1–2% | (emulsifier) |
| Promulgen D | 1–2% | (emulsifier) |
| (b) Water | 26.4–29% | |
| Menthyl paraban | 0.1% | (preservative) |
| (c) Zinc chloride | 10–15% | |

The manufacture of Formulation 3 consists of the oil and the emulsifiers being melted at 75°–80° C. to form the oil phase. The water is also heated to 75°–80° C. and the water is gradually added to the oil phase under continuous mixing and stirring. The mixture is then cooled to 60° C. and the inorganic or organic halogen compound is slowly added under constant stirring. After cooling the mixture to 33°–35° C. the mixture is then used to fill the containers in which the product is to be marketed.

Examples of some other formulations which may be manufactured are as follows:

| FORMULA 4. | |
|---|---|
| (a) Mineral oil | 60% |

-continued

FORMULA 4.

| | | |
|---|---|---|
| | Glyceryl monostearate (SE) | 4% |
| | Emulgate 1000 NI | 8% |
| | Stearyl alcohol | 1% |
| | Promulgen D | 1% |
| (b) | Zinc chloride | 10% |
| (c) | Water | 16% |

FORMULA 5.

| | | |
|---|---|---|
| (a) | OIL PHASE | |
| | Acetulan | 1.17% |
| | Mineral oil USP | 45.8% |
| | Lanolin Anhydride | 0.7% |
| | GMS. SE | 2.67% |
| | Emulgate 1000 NI | 6.1% |
| | Stearyl alcohol | 0.76% |
| | Promulgen D | 0.75% |
| | Propyl paraban | 0.05% |
| (b) | WATER PHASE | |
| | Water | 27% |
| | Menthyl paraban | 0.05% |
| | Zinc chloride | 15% |

FORMULA 6.

| | | |
|---|---|---|
| (a) | OIL PHASE | |
| | Ohlan | 1% |
| | Ameroxol OE-10 | 2% |
| | Solulan 98 | 3% |
| | Cerasynt SD | 10% |
| | Mineral oil 70 VIS | 10% |
| (b) | Water | 57% |
| | Zinc chloride | 15% |
| | Triethanolamine | 2% |

The process of formulating Formula 6 consists of the water phase being added at 60° C. to the oil phase at 60° C., then cooled to room temperature and homogenized.

FORMULA 7.

| | | |
|---|---|---|
| (a) | OIL PHASE | |
| | Glucate SS | 0.8% |
| | Cetylalcohol | 2.0% |
| | Mineral oil 70 VIS | 6.0% |
| | Stearic Acid | 2.0% |
| (b) | WATER PHASE | |
| | Glucamate SSE-20 | 1.2% |
| | Glucam E-20 | 5.0% |
| | Water | 68.0% |
| | Zinc chloride | 15% |

The process of formulating Formula 7 consists of the water phase being added at 80° C. to the oil phase at 80° C., mixed continuously, then cooled to 35° C. and homogenized.

FORMULA 8.

| | | |
|---|---|---|
| (a) | OIL PHASE | |
| | Solulan 25 | 1.5% |
| | Mineral oil 70 VIS | 14.0% |
| | Petrolatum | 3.0% |
| (b) | WATER PHASE | |
| | Carbopol 934 | 0.75% |
| | Water | 60.25% |
| | Triethanolamine (10%) | 5.5% |

-continued

FORMULA 8.

| | |
|---|---|
| Zinc chloride | 15.0% |

Formula 8 is formulated by the Carbopol 934 being dispersed in the water which is heated to 65° C., while using a light speed of mixing, then added to the oil phase which is heated to 65° C. while mixing. When the emulsion has formed, the triethanolamine solution (which has not been previously added) is added, mixing continues, and the emulsion is then cooled to 30° C. The formulation is homogenized.

FORMULA 9.

| | | |
|---|---|---|
| (a) | OIL PHASE | |
| | While-Paraffin wax | 6.25% |
| | Petrolatum | 7.50% |
| | Glyceryl monostearate | 11.25% |
| | Liquid petrolatum | 15.00% |
| (b) | WATER PHASE | |
| | Water | 50.00% |
| | Zinc chloride | 10.00% |

Formulation 9 is formulated by boiling the water and adding to the oil phase which is heated to 80° C. while stirring. The formulation is then cooled to 30° C.

FORMULA 11.

| | | |
|---|---|---|
| (a) | OIL PHASE | |
| | Amerchol - L101 | 2.5% |
| | Modulan | 1.0% |
| | Solulan 16 | 1.5% |
| | Glyceryl monostearate | 6.5% |
| | Supermacet | 3.0% |
| | Isopropyl palmitate | 2.5% |
| (b) | WATER PHASE | |
| | Glycerine | 3.0% |
| | Water | 65.0% |
| | Zinc chloride | 15.0% |

Processing consists of the water phase being added at 85° C. to the oil phase at 85° C. while mixing, and continuing to mix, then cooled to 38° C. and homogenized.

As many changes can be made to the invention without departing from the scope of the invention, it is intended that all material contained herein be interpreted as illustrative of the invention and not in a limiting sense.

The embodiments of the invention in which an exclusive property or privilege is claimed are as follows:

1. A soldering flux composition comprising a water-soluble oil-in-water emulsion paste in turn comprising:
   (a) an oil type material
   (b) an emulsifier,
   (c) water, and
   (d) a fluxing agent comprising an inorganic or organic halogen compound capable of removing oxide from a metal surface to be soldered.

2. A soldering flux composition as claimed in claim 1, and further comprising a preservative.

3. A soldering flux composition as claimed in claim 1, wherein the oil type material is present in an amount of up to about 80% of the formulation, the emulsifier is present in an amount of between about 2% and about 20%, the fluxing agent is present in an amount of between about 2% and about 20%, and the water making up the balance.

4. A soldering flux composition as claimed in claim 2, wherein the preservative is present in an amount of about 0.1%.

5. A soldering flux composition as claimed in claim 2, wherein the oil type material is present in an amount of up to about 80%, the emulsifier is present in an amount of between about 2% and about 20%, the fluxing agent is present in an amount of between about 2% and about 20%, and the water making up the balance.

6. A soldering flux composition as claimed in claim 1, wherein the emulsifier is selected from the group consisting of glyceryl monostearate and stearyl alcohol.

7. A soldering flux composition as claimed in claim 1, wherein the oil type material is selected from the group consisting of mineral oil, vegetable oil, petrolatum, waxes, and petroleum jelly.

8. A soldering flux composition as claimed in claim 3, wherein the oil type material is selected from the group consisting of mineral oil, vegetable oil, petrolatum, waxes and petroleum jelly.

9. A soldering flux composition as claimed in claim 1 and in which said fluxing agent is selected from the group consisting of ammonium chloride, tin chloride, magnesium chloride, zinc chloride, zinc bromide, zinc iodide, sodium chloride, sodium bromide and potassium bromide.

10. A soldering flux composition as claimed in claim 3 and in which said fluxing agent is selected from the group consisting of ammonium chloride, tin chloride, magnesium chloride, zinc chloride, zinc bromide, zinc iodide, sodium chloride, sodium bromide and potassium iodide.

11. A soldering flux composition as claimed in claim 7 and in which said fluxing agent is selected from the group consisting of ammonium chloride, tin chloride, magnesium chloride, zinc chloride, zinc bromide, zinc iodide, sodium chloride, sodium bromide and potassium iodide.

12. A soldering flux composition as claimed in claim 8 and in which said fluxing agent is selected from the group consisting of ammonium chloride, tin chloride, magnesium chloride, zinc chloride, zinc bromide, zinc iodide, sodium chloride, sodium bromide and potassium iodide.

* * * * *